United States Patent

Kindig

[15] 3,702,095
[45] Nov. 7, 1972

[54] AUTOMATIC ADJUSTMENT OF AN EXPOSURE REGULATING DEVICE IN A COLLAPSIBLE CAMERA

[72] Inventor: Guilford Edwin Kindig, Rochester, N.Y.

[73] Assignee: Eastman Kodak Company, Rochester, N.Y.

[22] Filed: Feb. 22, 1972

[21] Appl. No.: 227,983

[52] U.S. Cl....................95/11 R, 95/31 FS, 95/39, 95/64 R, 352/141
[51] Int. Cl..........................G03b 17/04, G03b 9/02
[58] Field of Search.....95/11 R, 19, 39, 64 R, 31 FS; 352/72, 141

[56] References Cited

UNITED STATES PATENTS 3,537,374  11/1970  Jenkins.....................95/64 R

FOREIGN PATENTS OR APPLICATIONS 1,066,386  4/1967  Great Britain............95/31 FS Primary Examiner—Robert P. Greiner
Attorney—W. H. J. Kline et al.

[57] ABSTRACT

A collapsible camera having an adjustable exposure regulating device incorporated in its movable shutter assembly is loaded with a film container having coding means representing a characteristic of film therein. When the camera is collapsed, a code sensing element of the shutter assembly is located adjacent to the film container and is influenced by the coding means to adjust the exposure regulating device. Means are provided to require collapsing of the camera whenever the film container is replaced to ensure that the exposure regulating device is adjusted by the coding means of the new film container.

8 Claims, 7 Drawing Figures

PATENTED NOV 7 1972 3,702,095

PATENTED NOV 7 1972

3,702,095

SHEET 2 OF 2 he present invention relates to a collapsible camera
AUTOMATIC ADJUSTMENT OF AN EXPOSURE REGULATING DEVICE IN A COLLAPSIBLE CAMERA

CROSS-REFERENCE TO RELATED APPLICATION

Reference is made to commonly assigned, copending U.S. Pat. application Ser. No. 94,360, entitled COMPACT FILM-PACK CAMERA and filed Dec. 2, 1970 in the name of Donald M. Harvey.

BACKGROUND OF THE INVENTION

1. Field of the Invention

The present invention relates to a collapsible camera and more particularly to means for automatically adjusting an exposure control device incorporated in the shutter assembly of such a camera.

2. Description of the Prior Art

In recent years, it has become well known to provide a film container with coding means indicative of the speed or some other characteristic of film therein and to employ such coding means to effect automatic adjustment of the exposure control system of a camera loaded with such a film container. In most cases, the exposure control system of the camera is incorporated in a shutter assembly located in fixed relation to the camera body and includes a code sensing element that is engaged with and positioned by the coding means of the film container to produce a corresponding adjustment of the exposure control system. If the camera's shutter assembly is movable relative to the film container to permit the camera to be collapsed, the previous practice has been to employ a flexible connection between the code sensing element mounted in the body of the camera and the camera shutter assembly, in order to translate the position of the sensing element into an appropriate adjustment of the exposure regulating device. For example, the sensing element may serve to adjust a resistive device in the camera body, which is incorporated in the electrical circuit of the exposure control system by means of flexible wires leading to the shutter assembly. Alternatively, the sensing element could adjust the shutter assembly through a collapsible mechanical linkage. Regardless of the type of flexible connection used, however, any such arrangement significantly complicates the construction and assembly of the camera and detracts from its durability, particularly in the case of a self-processing camera in which the relatively large film format dictates a correspondingly large movement of the shutter assembly between its extended and retracted positions.

SUMMARY OF THE INVENTION

The principal object of the present invention is to simplify and improve the means by which an exposure regulating device in a collapsible camera is adjusted automatically in accordance with coding means carried by a film container loaded into the camera; a correlative object is to effect such adjustment without recourse to flexible connecting means between the camera shutter assembly and the code sensing element employed to detect the film container coding means.

In accordance with the present invention, the entire camera shutter assembly, including the exposure regulating device and its code sensing element, is moved between an operative or extended position remote from the film container and an inoperative or retracted position in close proximity to the film container. When the camera is in the latter condition, the code sensing element detects the coding means of the film container to adjust the exposure regulating device in accordance with one or more coded film characteristics. To ensure that the exposure regulating device is adjusted by the coding means of the new film container, means are also provided to require movement of the shutter assembly to its retracted position whenever the film container is replaced.

Various means for practicing the invention and other advantages and novel features thereof will be apparent from the detailed description of the preferred embodiment presented below.

BRIEF DESCRIPTION OF THE DRAWINGS

In the detailed description of the preferred embodiment of the invention presented below, reference is made to the accompanying drawings wherein like reference numerals denote like elements and wherein.

DESCRIPTION OF THE PREFERRED EMBODIMENT

Because photographic cameras and film units of the type to which the present invention relates are well known, the following description is directed in particular to elements forming part of, or cooperating more directly with, the present invention. Camera and film elements not specifically shown or described herein are selectable from those known in the art.

Figure 1:
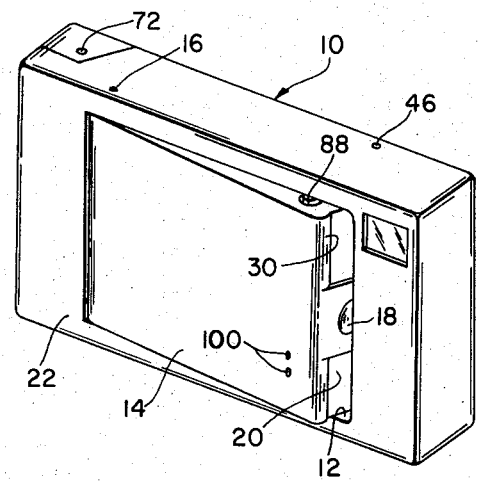
FIG. 1 is a perspective view of a collapsible self-processing camera provided with an exposure control adjusting mechanism according to the preferred embodiment of the invention, showing the camera in its retracted or collapsed condition.
Figure 2:
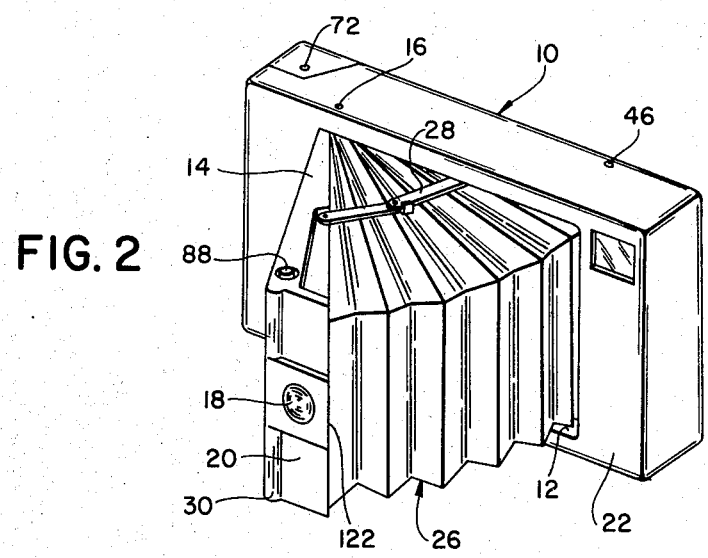
FIG. 2 corresponds to FIG. 1 but shows the camera in its extended or operative condition.

The collapsible camera depicted in the accompanying drawings as illustrative of the preferred embodiment of the invention is of the self-processing type and comprises a box-like housing 10 having a forwardly facing opening 12 provided with a lens support door 14. The lens support door is attached to the housing by a hinge pin 16 so that it is movable between the retracted or closed position shown in FIGS. 1, 3, and 6 and the extended or operative position shown in FIG. 2. The camera shutter assembly, comprised of lens 18 and other internal elements described below, is carried by the sloped end portion 20 of door 14 opposite to hinge pin 16. When the lens support door is in its retracted position shown in FIGS. 1, 3, and 6, it protrudes only slightly beyond the front wall 22 of housing 10. Accordingly, the camera can be carried conveniently in the photographer's pocket or in an appropriate carrying case, with the lens partially received within opening 12.

Figure 6:
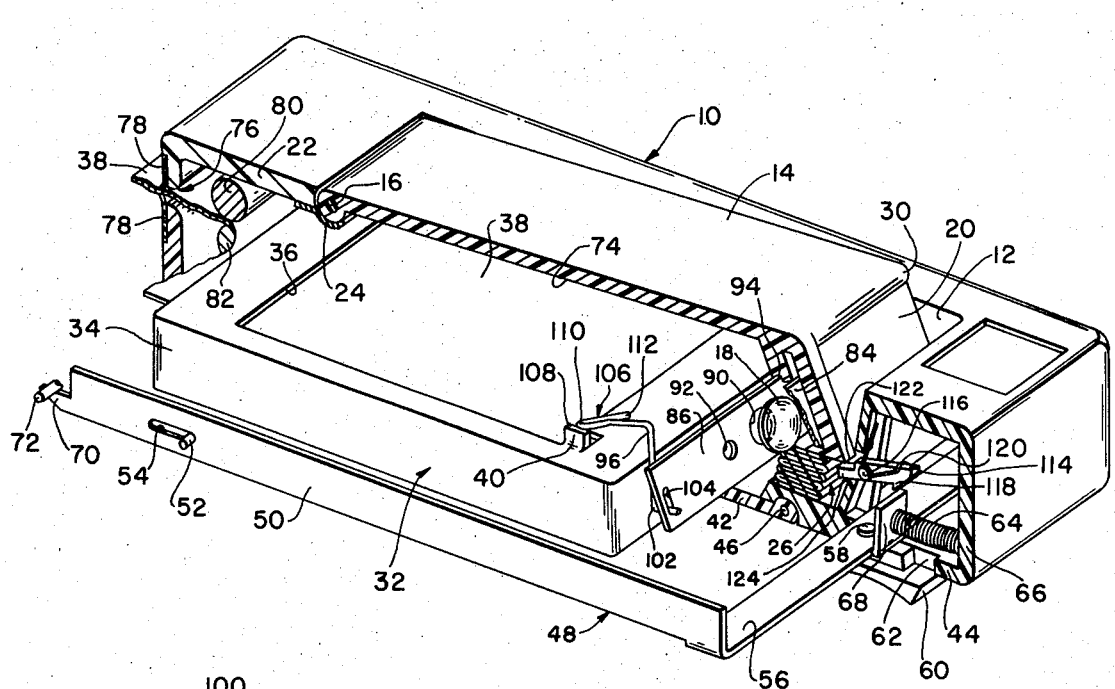
FIG. 6 is a fragmentary perspective view showing the cooperation of the basic components of the exposure regulating device with the coding means of the film container when the camera is in its retracted or collapsed condition.

A light-tight joint is established between the hinged end of the lens support door and the camera housing by a sealing flap 24, shown in FIG. 6. The remaining three edges of the door are connected to the camera housing by a light-tight, accordian-pleated bellows 26 that is located within housing opening 12 when door 14 is closed or retracted. A jointed strut 28, shown in FIG. 2, extends between door 14 and the camera housing 10 and is also enclosed within the housing when the door is closed. A toggle spring, not shown, resiliently holds the strut in either its extended condition or its folded condition. To open the door, the photographer pulls it forwardly against the resistance of the toggle spring by means of the finger grip lip 30 adjacent to the camera lens. In its fully extended condition, the strut locates the lens support door at a predetermined open position in which the lens is in fixed parallel relation to the camera housing. To collapse the camera, the photographer manually moves the lens support door rearwardly in opposition to the toggle spring, which then resiliently holds the door in its closed position. These features of the camera are disclosed in detail in the above-referenced commonly assigned, copending U.S. Pat. application Ser. No. 94,360, entitled COMPACT FILM-PACK CAMERA and filed Dec. 2, 1970 in the name of Donald M. Harvey.

Figure 4:
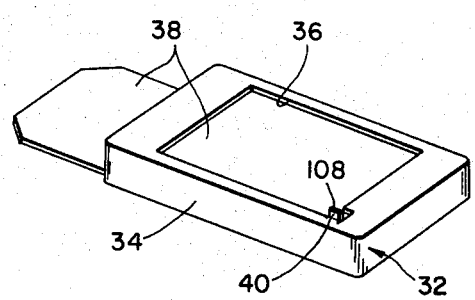
FIG. 4 is a perspective view of a coded film pack or film container of the type used in the camera shown in FIGS. 1-3.
Figure 5:
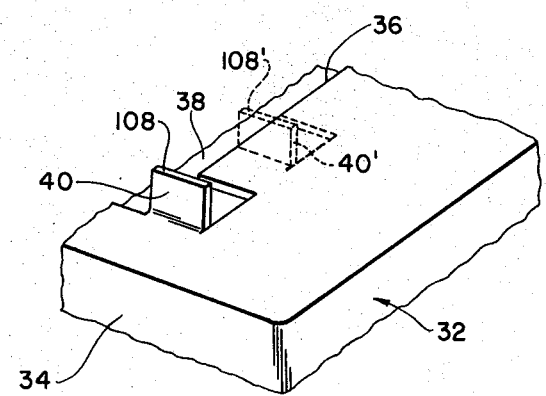
FIG. 5 is an enlarged fragmentary view depicting the coding means embodied in the film container.

The camera is adapted to be loaded with a film container or film pack 32 of the type illustrated in FIGS. 4–6, which is well known in the photographic art. Briefly, the film pack comprises a box-like casing 34 provided with a front exposure opening or window 36. A plurality of self-processing film units, not shown, are initially stacked inside the casing behind an opaque masking strip 38 that covers opening 36 and extends out of the casing through an appropriate slot in one of its end walls. The film units are provided with respective leader strips and are connected to each other and to the masking strip in such a way that the withdrawal of the masking strip pulls the leader strip of the first available film unit to an accessible position and the withdrawal of each successive film unit similarly brings the leader strip of the next film unit to that same position. Accordingly, the photosensitive exposure surface of each successive film unit is in turn located behind the window 36 so that all of the available film units can be exposed and processed in sequence.

For illustrative purposes, it is assumed that the film pack is adapted to contain film having one of two predetermined sensitivities, e.g., black-and-white film with an ASA speed rating of 3,000 or color film with an ASA speed rating of 300. The sensitivity of the film in the film pack is indicated by coding means, best shown in FIG. 5, comprising a coding tab or ear 40 bent forwardly from the front wall member of the film pack casing. If the film pack is loaded with color film, the coding ear 40 is positioned as shown in FIGS. 4–6, but if the film pack contains the much faster black-and-white film, the coding ear or tab is located at a different position designated by the numeral 40' and shown in broken lines in FIG. 5.

Figure 3:
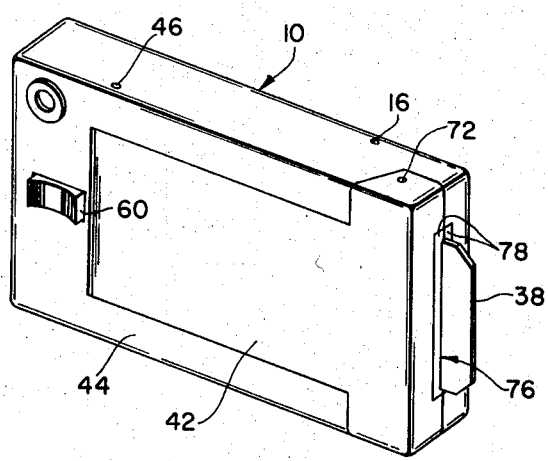
FIG. 3 is a perspective back view of the camera shown in FIGS. 1 and 2.

A loading door 42, best shown in FIGS. 3 and 6, is pivotably supported by the back wall 44 of the camera casing by a hinge pin 46 and is adapted to be latched in its closed position by a latching mechanism best depicted in FIG. 6. The latching mechanism includes a latch member 48 comprising a pair of elongate arms extending along the inner surfaces of the upper and lower walls of the camera housing, one of such arms being illustrated at numeral 50 in FIG. 6. Each of the two arms 50 is supported for longitudinal sliding movement by a stationary pin 52 extending through an elongate slot 54, and the two arms are connected by a cross bar 56. The cross bar, in turn, is connected by a rivet 58 to an externally accessible slidable latch release member 60 that projects through a slot 62 in the rear wall of the camera housing. A coil spring 64 is compressed between the end wall 66 of the camera housing and an ear 68 on cross bar 56 to urge the latch member toward the position shown in FIG. 6. In this position, latch member teeth 70 at the ends of arms 50 engage corresponding latching pins 72 carried by the cover door to hold the latter in its closed position. By sliding latch release member 60 toward the adjacent end of the camera housing in opposition to spring 64, the photographer can disengage the latch member teeth 70 from the corresponding pins 72, thereby allowing the door to be moved to its open position so that the film pack can be installed in the camera. After the film pack has been loaded into the camera, the closed loading door urges it against appropriate locating means defined by the camera housing, which accurately locate the film pack so that the emulsion surface of the film unit to be exposed is positioned in coincidence with a focal plane of the extended camera lens. As described in greater detail in the aforementioned U.S. Pat. application Ser. No. 94,360, the loaded film pack is partially surrounded by the collapsed bellows 26 and extends partially into the rearwardly facing cavity 74 of the lens support door 14.

With the film pack positioned in the camera as described above, the leader end of the opaque masking strip extends through an exit slot 76 in the camera housing provided between the adjacent confronting edges of the housing and the loading door. As shown at numeral 78, resilient flaps are provided along the edges of slot 76 to prevent light from entering the camera housing. Inside the closed housing, the masking strip passes between a forward pressure roller 80 rotatably mounted on the housing and an opposing rearward pressure roller 82 rotatably mounted on the loading door. By pulling on the externally accessible end of the masking strip, the photographer can remove that strip from the camera and thereby bring the leader strip of the first available film unit to the same accessible position. After each film unit has been exposed, it is withdrawn by means of its accessible leader strip and is thereby pulled between the opposed pressure rollers, which rupture a processing fluid container incorporated in the film unit and distribute the fluid over the exposed photosensitive sheet surface in a manner well known in the self-processing camera art.

FIG. 6 best illustrates the shutter assembly of the camera and its code-responsive exposure regulating device, to which the invention is particularly directed. This assembly is carried entirely by the lens support door and includes lens 18, a conventional shutter blade, partially depicted at numeral 84, and a slidably movable aperture plate 86 located rearward of the lens. The shutter blade is actuated by means of an externally accessible operating button 88, shown in FIGS. 1 and 2. Aperture plate 86 is provided with a relatively large aperture 90, depicted in alignment with the lens, and a smaller aperture 92. Plate 86 is supported for sliding movement by grooves 94 in the sloped forward portion of the cover door so that it can be moved between its illustrated position, in which the large aperture 90 is aligned with the lens to provide proper exposure of the slower color film, and an alternate position, in which the smaller aperture 92 is aligned with the lens to expose properly the faster black-and-white film.

Figure 7:
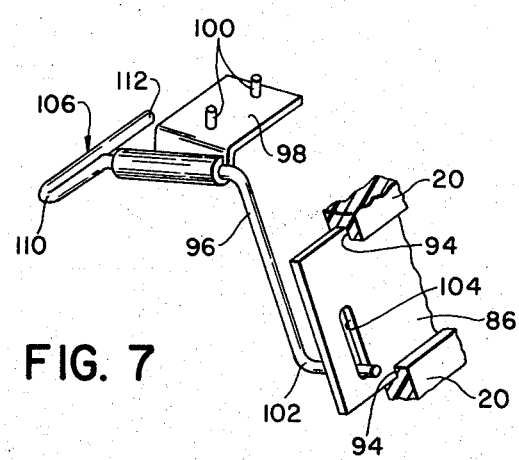
FIG. 7 is an enlarged perspective view of the code sensing element shown in FIG. 6.

The position of the aperture plate is established by code-sensing element 96, best shown in FIG. 7, which comprises a bent piece of stiff wire pivotably supported by a bracket 98 attached to the camera door 14 by rivets 100. One end of the sensing element is bent to provide a crank arm 102 that extends through a slot 104 in the aperture plate, and the opposite end of the sensing element is bent to provide a cross bar 106. If door 14 is closed when the camera is loaded with a film pack containing color film, the forwardly facing edge surface 108 of coding ear 40 on the film pack engages the folded end 110 of the code-sensing-element cross bar 106 and pivots the sensing element in a clockwise direction, as viewed in FIG. 6, thereby positioning the larger aperture 90 in alignment with lens 18. If the film pack contains black-and-white film, however, the forward edge surface 108' of the corresponding coding ear 40', shown in broken lines in FIG. 5, engages the opposite end 112 of the code-sensing-element cross bar 106 and pivots the sensing element in a counterclockwise direction, as viewed in FIG. 6, so as to shift the aperture plate to the right and thereby align the smaller aperture 92 with lens 18. The aperture plate slides relatively easily between its two alternate positions but has sufficient frictional resistance to such movement to retain it in either position when door 14 is subsequently opened to its operative position. Accordingly, it will be apparent that the lens aperture is set automatically in accordance with the sensitivity of the film loaded into the camera.

To ensure that the exposure regulating device is adjusted to the sensitivity of new film whenever an old film pack is replaced, a locking lever 114 is pivotably supported on the camera housing by a pin 116 and includes a locking tooth 118 that is biased toward engagement with latch member ear 68 by a relatively weak hairpin spring 120. When the lens support door is closed, as shown in FIG. 6, edge surface 122 of the forward portion of the door adjacent to lens 18 engages tip 124 of the locking lever and holds that lever beyond engagement with latch member ear 68. When door 14 is open, however, the locking tooth 118 is engaged with ear 68 of the latch member and therefore prevents the latch member from being moved to the position at which it releases loading door 42. Accordingly, it will be seen that the loading door can be opened only when the lens support door is closed, thus ensuring that the exposure regulating device will be adjusted properly in accordance with the coding means on the new film pack installed in the camera.

Although the preferred embodiment of the invention depicts a relatively simple mechanism for adjusting the lens aperture, it should be apparent that similar means could also be employed for effecting automatic adjustment of the shutter speed or of an exposure control system that regulates either the lens aperture or the shutter speed or both as a function of available light. Such a device could also be employed to adjust other elements of a shutter assembly, such as by moving an appropriate filter into and out of alignment with the lens. Also, it should be apparent that the invention is not limited merely to distinguishing between two different speeds or types of film but can readily be adapted to adjust an exposure regulating device by cooperating with coding means capable of identifying a larger number of different film speeds or other film characteristics. Furthermore, the sensing element need not be physically displaced or positioned by the coding means on the film container but could comprise any type of device capable of being influenced by such coding means when brought into close proximity thereto, such as, for example, by electrical contact, magnetic influence, or optical influence. Similarly, the coding means need not necessarily be defined by the film container casing but could be provided by the masking sheet or some other element of the film pack.

The invention has been described in detail with particular reference to the preferred embodiment thereof, but it will be understood that variations and modifications can be effected within the spirit and scope of the invention.

What is claimed is:

1. A camera adapted to receive a film container provided with physically detectable coding structure representing an exposure determinative characteristic of film in the container, said camera comprising:
    a. exposure control means including a code sensing element movable to a plurality of positions to effect corresponding adjustments of said exposure control means; and
    b. support means supporting said exposure control means for movement between
        1. a first location, at which said code sensing element is separated from the coding structure of the container, and
        2. a second location, at which said code sensing element is engaged with and positioned by the coding structure of the container in accordance with the exposure determinative characteristic of the film in the container to effect corresponding adjustment of said exposure control means.

2. A camera as claimed in claim 1 further comprising interlocking means requiring movement of said exposure control means to said second location before the film container can be received by said camera.

3. A camera adapted to receive a film container provided with code means representing an exposure determinative film characteristic of film in the container, said camera comprising:
    a. exposure regulating means for regulating exposure of the film, said exposure regulating means being adjustable to regulate the exposure in accordance with the film characteristic;
    b. movable means supporting said exposure regulating means for movement between
        1. a first position close to the film container and 2. a second position remote from the film container;
c. a code sensing element movable with said exposure regulating means between
   1. an operative position wherein said element is adjacent to the code means to be influenced thereby in accordance with the film characteristic when said exposure regulating means is in said first position and
   2. an inoperative position wherein said element is remote from the code means when said exposure regulating means is in said second position; and
d. adjusting means interconnecting said element and said exposure regulating means for translating any influence of the code means on said element into a corresponding adjustment of said exposure regulating means.

4. A camera as claimed in claim 3 wherein said code sensing element is engageable with and positionable by the code means when said exposure regulating means is in said first position to effect the corresponding adjustment of said exposure regulating means.

5. A camera as claimed in claim 3 further comprising means defining an aperture for admitting light to the film to effect the exposure thereof, and wherein said exposure regulating means includes means for varying said aperture defining means.

6. A camera as claimed in claim 3 further comprising a housing, and wherein said movable means includes a door hingedly mounted on said housing and movably supporting said exposure regulating means and said code sensing element.

7. A camera as claimed in claim 3 further comprising interlocking means requiring movement of said code sensing element to said operative position before the film container can be received by said camera.

8. A camera as claimed in claim 3 further comprising a box-like housing for receiving the film container, a loading door mounted on said housing for movement between a closed position for enclosing the container within said housing and an open position for allowing movement of the container into and out of said housing, and latching means for releasably latching said loading door in said closed position, said latching means being releasable to permit movement of said loading door to said open position; wherein said movable means includes a frontal door mounted on said housing for movement between a retracted position wherein said code sensing element is in said operative position and an extended position wherein said element is in said inoperative position; and still further comprising interlocking means for interlocking said latching means and said frontal door to require movement of said frontal door to said retracted position before said latching means can be released to permit movement of said loading door from said closed position to said open position.

* * * * *